(12) United States Patent
Alriksson et al.

(10) Patent No.: US 11,418,964 B2
(45) Date of Patent: Aug. 16, 2022

(54) NETWORK NODE, METHOD AND COMPUTER PROGRAM FOR UNLICENSED SPECTRUM OPERATION

(71) Applicant: Telefonaktiebolaget LM Ericsson (publ), Stockholm (SE)

(72) Inventors: Peter Alriksson, Horby (SE); Tai Do, Lund (SE); Reem Karaki, Aachen (DE); Thomas Nilsson, Malmo (SE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 92 days.

(21) Appl. No.: 16/767,705

(22) PCT Filed: Dec. 19, 2018

(86) PCT No.: PCT/EP2018/085970
§ 371 (c)(1),
(2) Date: May 28, 2020

(87) PCT Pub. No.: WO2019/122000
PCT Pub. Date: Jun. 27, 2019

(65) Prior Publication Data
US 2020/0296591 A1   Sep. 17, 2020

Related U.S. Application Data

(60) Provisional application No. 62/609,072, filed on Dec. 21, 2017.

(51) Int. Cl.
*H04W 16/14* (2009.01)
*H04W 74/08* (2009.01)
(Continued)

(52) U.S. Cl.
CPC .......... *H04W 16/14* (2013.01); *H04B 7/0413* (2013.01); *H04L 1/1812* (2013.01); *H04L 1/1887* (2013.01); *H04W 74/0808* (2013.01)

(58) Field of Classification Search
CPC ... H04W 28/04; H04W 72/04; H04W 72/042; H04W 88/08; H04W 74/0808;
(Continued)

(56) References Cited

U.S. PATENT DOCUMENTS

2003/0188231 A1 * 10/2003 Cronce ................... G06F 21/51
714/52
2007/0261038 A1 * 11/2007 Suba ......................... G06F 8/51
717/136

(Continued)

OTHER PUBLICATIONS

3GPP TSG RAN WG1 Meeting #88bis, Hangzhou, China, May 15-19, 2017, R1-1708954, Agenda item: 7.1.3.3.6, Source: Sequans Communications, Title: On multiplexing of URLLC and eMBB in DL, (Year: 2017).*

(Continued)

*Primary Examiner* — Peter G Solinsky
*Assistant Examiner* — Sanjay K Dewan
(74) *Attorney, Agent, or Firm* — Leffler Intellectual Property Law, PLLC (57) ABSTRACT

A network node is arranged to provide communication at least in an unlicensed band where clear channel assessment, CCA, is required before transmissions. The unlicensed band comprises a plurality of carriers, or sets of carriers, defining channels. The network node is arranged to prepare code block groups comprising code blocks from transport blocks, which transport blocks each comprises a payload intended for a respective receiver, wherein each code block comprises a checksum enabling a hybrid automatic repeat request, HARQ, procedure on a per code block group basis, map the code block groups to a wideband signal comprising a consecutive set of channels on the carriers of the unlicensed band, assess whether the channels, respectively, are clear, and transmit the code block groups mapped on the channels which are clear and omit transmissions of code block groups (Continued)

mapped on channels that are not clear, wherein the assessment and the transmissions are performed within a first time interval, and transmit code blocks groups omitted to be transmitted using the HARQ procedure for retransmission prior receiving a non-acknowledgement, NAK, from a respective receiver of the code block group.

19 Claims, 4 Drawing Sheets

(51) Int. Cl.
*H04L 1/18* (2006.01)
*H04B 7/0413* (2017.01)

(58) Field of Classification Search
CPC .... H04W 16/14; H04L 5/0007; H04L 1/1812; H04L 1/1887; H04B 7/0413
USPC .......................................................... 370/329
See application file for complete search history.

(56) References Cited

U.S. PATENT DOCUMENTS

| | | | |
|---|---|---|---|
| 2017/0054455 A1* | 2/2017 | Goldberg | H03M 13/03 |
| 2018/0234881 A1* | 8/2018 | Hosseini | H04L 1/1864 |
| 2018/0269898 A1* | 9/2018 | Sun | H04L 1/1893 |
| 2018/0270022 A1* | 9/2018 | Sun | H04L 1/1896 |
| 2018/0270705 A1* | 9/2018 | Sun | H04W 28/06 |
| 2018/0287745 A1* | 10/2018 | Sun | H04L 1/1864 |
| 2018/0323920 A1* | 11/2018 | Zhu | H04L 5/0044 |
| 2018/0367257 A1* | 12/2018 | Li | H04W 72/042 |
| 2018/0375634 A1* | 12/2018 | Sun | H04L 1/06 |
| 2019/0021088 A1* | 1/2019 | Zhang | H04W 72/12 |
| 2019/0150124 A1* | 5/2019 | Nogami | H04W 72/14 370/330 |
| 2019/0191486 A1* | 6/2019 | Myung | H04W 76/27 |
| 2019/0379489 A1* | 12/2019 | Hwang | H04L 1/1819 |
| 2020/0059327 A1* | 2/2020 | Kini | H04W 72/042 |
| 2020/0374040 A1* | 11/2020 | Lou | H04L 1/1812 |

OTHER PUBLICATIONS

3GPP TSG RAN WG1 Meeting #86bis, Lisbon, Portugal, Oct. 10-14, 2016, R1-1609546, Source: Intel Corporation, Title: On eMBB and URLLC multiplexing, Agenda item: 8.1.8. (Year: 2016).*
3GPP TSG RAN WG1 Meeting #93, Busan, Korea, May 21-May 25, 2018, R1-1805923, Agenda item: 7.6.4.5, Source: Huawei, HiSilicon, Title: BWP operation in NR unlicensed band. (Year: 2018).*
3GPP TSG RAN WG1 Meeting #93, Busan, Korea, May 21-25, 2018, R1-1806112, Agenda item: 7.6.4.5, Source: Nokia, Nokia Shanghai Bell, Title: On Wideban operation for NR-U. (Year: 2018).*
PCT International Search Report, dated Mar. 22, 2019, in connection with International Application No. PCT/EP2018/085970 all pages.
PCT Written Opinion, dated Mar. 22, 2019, in connection with International Application No. PCT/EP2018/085970, all pages.
3GPP TSG RAN WG1 Meeting #88bis, R1-1708954, Hangzhou, China, May 15-19, 2017, "On multiplexing of URLLC and eMBB in DL", Sequans Communications, 6 pages.
3GPP TSG RAN WG1 Meeting #86bis, R1-1609546, Lisbon, Portugal, Oct. 10-14, 2016, "On eMBB and URLLC multiplexing", Intel Corporation, 5 pages.
3GPP TSG RAN WG1 Meeting #93, R1-1805923, Busan, Korea, May 21-25, 2018, "BWP operation in NR unlicensed band", Huawei, HiSilicon, 4 pages.
3GPP TSG RAN WG1 Meeting #93, R1-1806112, Busan, Korea, May 21-25, 2018, "On Wideband Operation for NR-U", Nokia, Nokia Shanghai Bell, 6 pages.
3GPP TSG RAN WG1 Meeting #93, R1-1806250, Busan Korea, May 21-25, 2018, "Frame structure for NR-U", Ericsson, 4 pages.

* cited by examiner

NETWORK NODE, METHOD AND COMPUTER PROGRAM FOR UNLICENSED SPECTRUM OPERATION

TECHNICAL FIELD

The present disclosure generally relates to a network node, method, and computer program for unlicensed spectrum operation. In particular, the disclosure relates to providing communication at least in an unlicensed band where clear channel assessment (CCA) is required before transmissions, and to advance retransmission for parts of transmission initially omitted due to occupied channels.

BACKGROUND

Currently the 5th generation of cellular system, called New Radio (NR) is being standardized in $3^{rd}$ Generation Partnership Project (3GPP). NR is developed for maximum flexibility to support multiple and substantially different use cases. Besides the typical mobile broadband use case, also machine type communication (MTC), ultra-reliable low latency communications (URLLC), side-link device-to-device (D2D) and several other use cases too.

In NR, the basic scheduling unit is called a slot. A slot consists of 14 Orthogonal Frequency Division Modulation (OFDM) symbols for a normal cyclic prefix configuration. The OFDM symbol duration for 60 kHz subcarrier spacing is ~16.7 µs. As an example, a slot with 14 symbols at 60 kHz subcarrier-spacing is 250 µs long (including cyclic prefixes).

NR also supports flexible bandwidth configurations for different User Equipments (UEs) on the same serving cell. In other words, the bandwidth monitored by a UE and used for its control and data channels may be smaller than the carrier bandwidth. One or multiple bandwidth part configurations for each component carrier can be semi-statically signalled to a UE, where a bandwidth part consists of a group of contiguous Physical Resource Blocks (PRBs). Reserved resources can be configured within the bandwidth part. The bandwidth of a bandwidth part equals to or is smaller than the maximal bandwidth capability supported by a UE.

NR is targeting both licensed and unlicensed bands and a work item named NR Unlicensed (NR-U) is expected. It is expected that some features in NR will need to be adapted to comply with the special characteristics of the unlicensed band as well as also different regulation. A subcarrier spacing of 60 kHz or 30 kHz are the most promising candidates for NR-U OFDM numerologies for frequencies below 7 GHz.

The data unit that goes between the Medium Access Control (MAC) layer and the physical layer is called a transport block. The physical layer can transmit one or more transport blocks per slot. Each transport block has a Cyclic Redundancy Check (CRC) attached to it, so that the receiver can determine if the transport block was correctly decoded or not. For coding efficiency reasons, large transport blocks need to be segmented into smaller code blocks. In Long Term Evolution (LTE) and NR, typical maximum code block sizes are in the range of some thousands of bits, whereas typical maximum transport block sizes are in the range of tens of thousands of bits. When a transport block is segmented into code blocks, each code block also has a CRC attached to it.

Traditionally radio access technologies developed by 3GPP has adopted Hybrid Automatic Repeat reQuest (HARM) feedback per transport block. That is, even if only a single code block is in error, there is no way for the receiver to convey that information to the transmitter. Thus, the transmitter has no choice but to retransmit, possible using a different redundancy version, the whole transport block. To improve this situation NR has introduced a mechanism called code block group feedback. As the name suggests, the code blocks are grouped and feedback is sent for each group of code blocks. In NR terminology, a network node, i.e. base station, of access network is called gNodeB (gNB). The gNB can configure the UE with the size of the code block groups.

When operating in unlicensed spectrum many regions in the world require a device to sense the medium as free before transmitting. This, operation is often referred to as listen before talk (LBT). There are many different flavours of LBT, depending on which radio technology the device uses and which type of data it wants to transmit at the moment. Common for all flavours is that the sensing is done in a particular channel, corresponding to a defined carrier frequency, and over a predefined bandwidth. For example, in the 5 GHz band, the sensing is done over 20 MHz channels.

Many devices are capable of transmitting, and receiving, over a bandwidth that is larger than the bandwidth of a single channel. A device is only allowed to transmit on the channels where the medium is sensed as free. Again, there are different flavours of how the sensing should be done when multiple channels are involved.

In principle, there are two ways a device can operate over multiple channels. One way is that the transmitter/receiver bandwidth is changed depending on which channels that were sensed as free. In this setup, there is only one processing chain and the multiple channels are treated as one channel with a larger bandwidth. The other way is that the device operates almost independent processing chains for each channel. Depending on how independent the two processing chains are, this option can be referred to as either carrier aggregation or dual connectivity.

In this disclosure, we will focus on the first option, which from an implementation point of view is simpler than the second option.

When the device uses the first option, i.e. it uses one processing chain and treats the multiple channels as one channel with larger bandwidth, problems occur if some of the channels are not sensed as free. In particular, the time from when the channel sensing is done to when the transmitter shall start its transmission is in general very short. This leaves little room for re-encoding the transport block(s) that the transmitter had planned to transmit to match the available channels.

Using prior art methods, the transmitter would be forced to not transmit on the channels that were sensed as busy. The receiver would then not be able to decode the transport block correctly and thus would send a Non-AcKnowledgement (NAK) to the transmitter. The transmitter would then have to wait for the response from the receiver and retransmit the full transport block again where the same problem could occur again.

This is clearly not an efficient use of radio resources and it also causes delays until the transport block can be successfully decoded by the receiver. Thus, there is a need for methods to improve the radio resource usage and/or delays.

SUMMARY

The disclosure is based on the inventors' understanding that retransmission may be hurried since the network node knows that one or more code block groups were never sent.

The inventors therefore suggest that the network node performs the retransmission using the retransmission procedure but without waiting for a NAK.

According to a first aspect, there is provided a network node arranged to provide communication at least in an unlicensed band where clear channel assessment, CCA, is required before transmissions. The unlicensed band comprises a plurality of carriers, or sets of carriers, defining channels. The network node is arranged to prepare code block groups comprising code blocks from transport blocks, which transport blocks each comprises a payload intended for a respective receiver, wherein each code block comprises a checksum enabling a hybrid automatic repeat request, HARQ, procedure on a per code block group basis. The network node is further arranged to map the code block groups to a wideband signal comprising a consecutive set of channels on the carriers of the unlicensed band. The network node is further arranged to assess whether the channels, respectively, are clear, and transmit the code block groups mapped on the channels which are clear and omit transmissions of code block groups mapped on channels that are not clear, wherein the assessment and the transmissions are performed within a first time interval. The network node is arranged to transmit code blocks groups omitted to be transmitted using the HARQ procedure for retransmission prior receiving a non-acknowledgement, NAK, from a respective receiver of the code block group.

The network node may be arranged to retransmit the code block groups omitted to be transmitted due to the channel not being clear using a same redundancy version as the omitted transmission would have used.

A transport block comprising code block groups for transmissions within the first time interval may be matched to channels which are determined by the CCA.

That is, when commencing with transmissions, i.e. CCA has not yet provided any result, the pre-processing has no information about what channels are idle and what channels are occupied. However, the pre-processing is readily aware of what channels CCA is going to be performed on. Thus, matching is performed on channels where a result of CCA is expected soon.

On the other hand, when a CCA result is present for a current time and the pre-processing can take that into account, a transport block which may be transmitted within the first time interval, at least partly, the matching is made on known result of the CCA, i.e. to clear channels.

The mapping of code block groups for a receiver may comprise alignment of the code block groups to adjacent channels. The network node may be arranged to apply multiple-input-multiple-output, MIMO, wherein the alignment of the code block groups is further based on used MIMO layers. The network node may be arranged to provide control signals to receivers about code block group alignment.

The network node may be arranged to apply guard bands between the channels at initial mapping of the code block groups to the channels. The network node may further be arranged to omit guard bands between adjacent clear channels at further transmissions when mapping of the code block groups to the channels when result of CCA is known for the first time interval.

The mapping of the code block groups to a wideband signal may comprise mapping in time and channel, and the network node may be arranged to initially group code blocks into the code block groups time-wise for forming the code block groups, and then to map the code block groups on the channels.

According to a second aspect, there is provided a method performed by a network node which is arranged to provide communication at least in an unlicensed band where clear channel assessment, CCA, is required before transmissions, wherein the unlicensed band comprises a plurality of carriers, or sets of carriers, defining channels. The method comprises preparing code block groups comprising code blocks from transport blocks, which transport blocks each comprises a payload intended for a respective receiver, wherein each code block comprises a checksum enabling a hybrid automatic repeat request, HARQ, procedure on a per code block group basis. The method further comprises mapping the code block groups to a wideband signal comprising a consecutive set of channels on the carriers of the unlicensed band. The method also comprises assessing whether the channels, respectively, are clear, and transmitting the code block groups mapped on the channels which are clear and omitting transmissions of code block groups mapped on channels that are not clear, wherein the assessment and the transmissions are performed within a first time interval. The method comprises transmitting code blocks groups omitted to be transmitted using the HARQ procedure for retransmission prior receiving a non-acknowledgement, NAK, from a respective receiver of the code block group.

The method may comprise retransmitting the code block groups omitted to be transmitted due to the channel not being clear using a same redundancy version as the omitted transmission would have used.

The method may comprise matching a transport block comprising code block groups for transmission within the first time interval to channels which are determined by the CCA.

The mapping of code block groups for a receiver may comprise aligning the code block groups to adjacent channels. The method may comprise applying multiple-input-multiple-output, MIMO, wherein the aligning of the code block groups is further based on used MIMO layers. The method may comprise providing control signals to receivers about code block group alignment.

The method may comprise applying guard bands between the channels at initial mapping of the code block groups to the channels. The method may further be arranged to omit guard bands between adjacent clear channels at further transmissions when mapping of the code block groups to the channels when result of CCA is known for the first time interval.

The mapping of the code block groups to a wideband signal may comprise mapping in time and channel, and the method may comprise initially grouping code blocks into the code block groups time-wise for forming the code block groups, and then mapping the code block groups on the channels.

According to a third aspect, there is provided a computer program comprising instructions which, when executed on a processor of a network node, causes the network node to perform the method according to the second aspect.

BRIEF DESCRIPTION OF THE DRAWINGS

The above, as well as additional objects, features and advantages of the present disclosure, will be better understood through the following illustrative and non-limiting detailed description of preferred embodiments of the present disclosure, with reference to the appended drawings.

DETAILED DESCRIPTION

The bandwidth for NR is estimated to increase as compared with LTE to up to a couple of hundreds of MHz. Therefore, scheduling for example a user of a mobile broadband service over the full transmission bandwidth may result in very large transport block (TB) sizes. A data packet may typically be formed as a TB which will be segmented into multiple smaller size code blocks (CBs) with maximum CB size of for example 6144 bits. Each TB is typically associated with one HARQ process in the MAC layer where feedback acknowledgment corresponds to TB decoding status. Thus, receiver node will only report an ACK if all the CBs in the corresponding TB are correctly decoded and will report NAK otherwise. The TB segmentation process is mainly deployed in LTE to reduce the complexity of the encoding/decoding operations, and is expected to be used in NR technology too. Using for example CRC error detecting code for each of the CBs, the decoding failure can be detected separately. Reducing the retransmission to only convey failed CBs will result in saving retransmission physical resources and transmit energy. With a great number of CBs, HARQ transmissions may be too complex. It has been agreed for the HARQ operation in NR to allow for code block group (CBG)-based retransmission with configurable granularity of the CBGs. In this proposed feedback model, CBs of a TB are grouped into a plurality of CBGs where each CBG will be acknowledged separately. A CBG acknowledgment is ACK if all of the CBs in the CBG are successfully decoded, and it is NAK otherwise. The size of CBGs may be configured based on TB size, but may also be based on other parameters. This disclosure is based on the assumption that CBGs are used, and reference is made to CBGs throughout the disclosure, but is equally suitable for other partitioning of transmissions.

A network node uses one processing chain and treats the multiple channels as one channel with larger bandwidth, as discussed above. Consider that some of the channels are not sensed as free. The time from when the channel sensing is done to when the transmitter shall start its transmission leaves little room for re-encoding the transport block(s) that the transmitter had planned to transmit to match the available channels. The network node then transmits on the clear channels, but is forced to not transmit on the channels that were sensed as busy. The receiver would then not be able to decode the transport block which were omitted to be sent correctly and thus would send a Non-AcKnowledgement (NAK) to the transmitter. The network node transmits code blocks groups omitted to be transmitted using the HARQ procedure for retransmission prior receiving the NAK from the receiver of the code block group.

This is feasible because the network node already knows when starting the transmission that some code blocks will not be transmitted, it can then retransmit them already in the next transmission interval (e.g. slot or mini-slot) instead of waiting for feedback from the receiver. This provides for shorter delays when the, from an implementation point of view simpler, single processing chain solution is used. This is achieved without enforcing stringent processing requirements on the transmitter.

Preferably, the receiver is configured to use code block group HARQ feedback which allows the transmitter to only retransmit the code block groups that were not decoded correctly because some or all of the code blocks in the group where not transmitted. That is, when a retransmission arrives before the receiver managed to transmit the NAK, the receiver should understand what to do with it.

Furthermore, aligning of allocations to different receivers with the bandwidths of the channels where LBT is done may be applied, which may reduce the risk that parts of the transport block which aim at a particular receiver cannot be transmitted.

Further, the code block groups can be aligned, e.g. as closely as possible in adjacent channels, to the bandwidth of the different channels, which may reduce the number of code blocks that are retransmitted even though they were decoded correctly by the receiver.

Still further, the transport block may be rate matched to the available channels.

Figure 1:
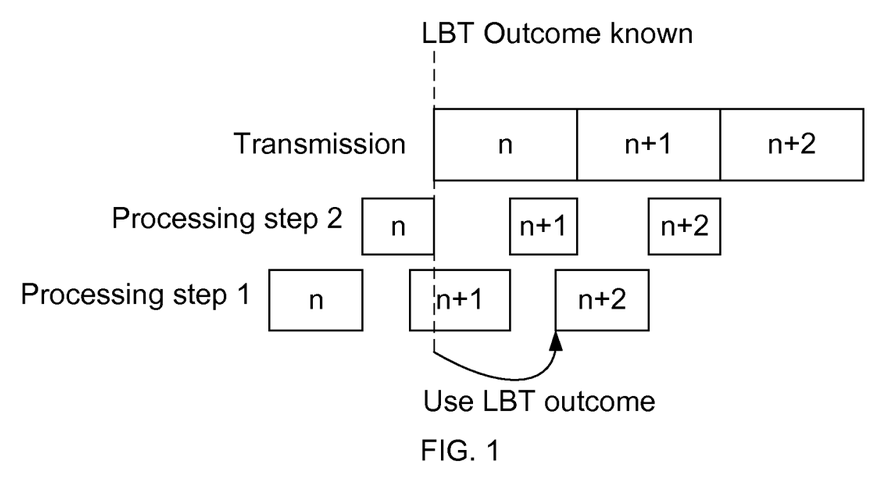
FIG. 1 is a timing diagram illustrating transmissions of code block groups and the processing steps of preparing and allocating the code block groups.

FIG. 1 is a timing diagram illustrating transmissions of code block groups and the processing steps of preparing and allocating the code block groups. Processing step 1 typically comprises segmenting a transport block into code block groups and forming the structure of the code block groups, e.g. applying the CRC which enables the per code block group HARQ. Processing step 2 typically comprises allocating the code block groups to channels. At the dashed line, outcome of LBT is known, i.e. what channels are idle and what channels are occupied, and the transmission can commence. CBG n is ready from Processing step 1 and is transmitted, and CBG n+1 becomes ready from both Processing step 1 and 2 before CBC n is finished transmitting, so CBG n+1 is transmitted consecutively. Processing step 1 for CBG n+2 does not commence until after the LBT outcome is known, and the LBT knowledge can therefore be used at Processing step 1 for CBG n+2, e.g. for omitting guard bands etc. The LBT outcome is valid for a certain time period given by rules for the unlicensed spectrum and the used radio access technology, and the procedure continues until the time period or information to be transmitted are out, whichever occurs the first.

Figure 2:
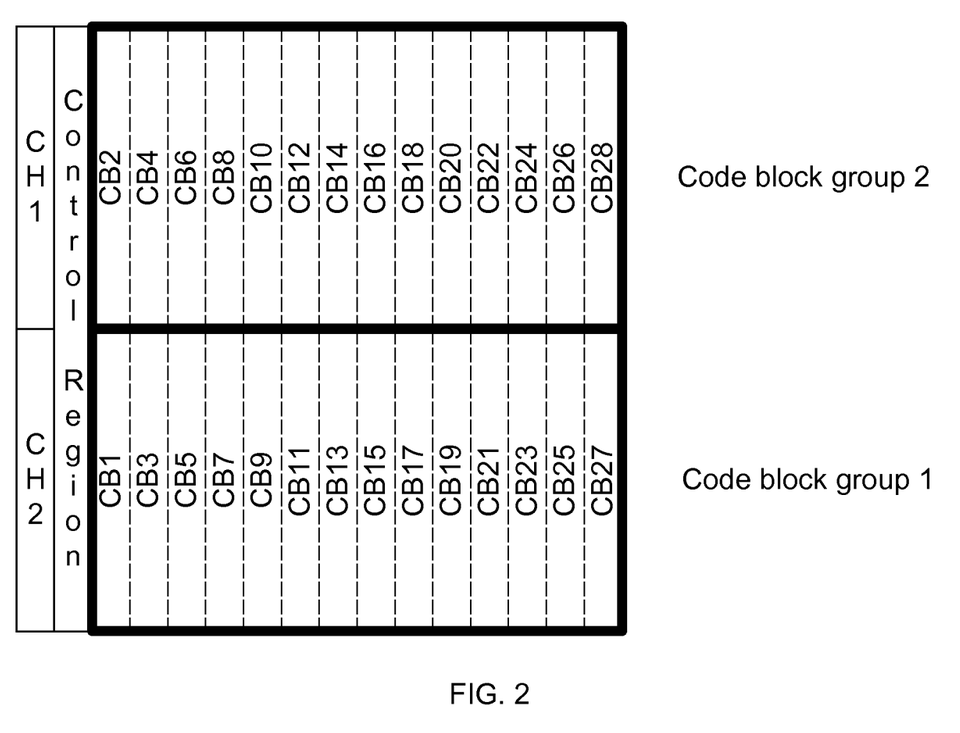
FIG. 2 is a time channel diagram illustrating transmission on two adjacent channels where code block groups, CBGs, to one user are transmitted in parallel on the two channels.

FIG. 2 is a time channel diagram illustrating transmission on two adjacent channels where CBGs to one user are transmitted in parallel on the two channels. Within each CBG, the assignment of code blocks can be seen.

Figure 3:
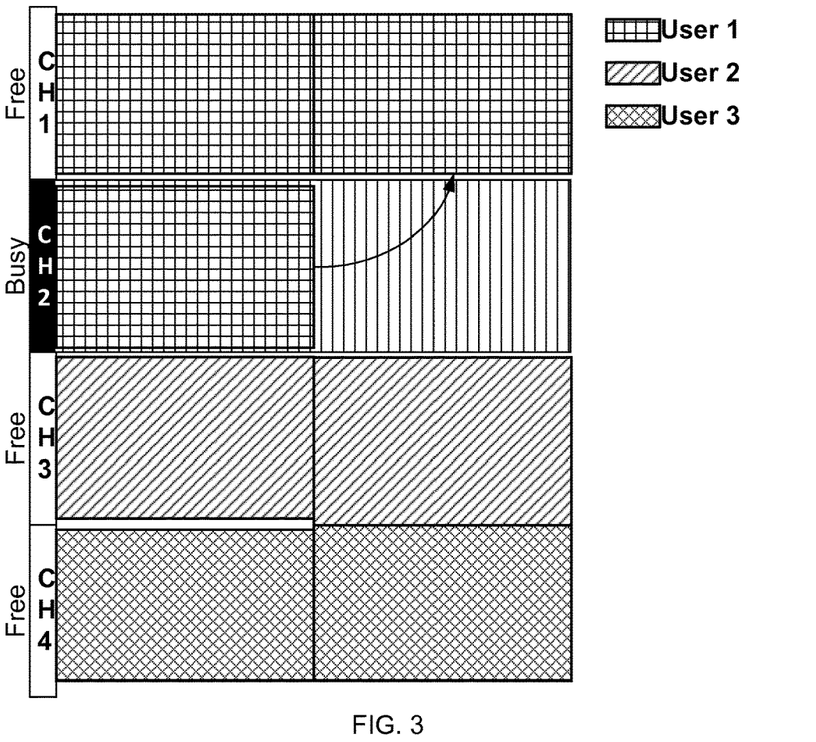
FIG. 3 is a time channel diagram illustrating transmission on four channels towards three users/receivers during two time slots each corresponding to duration of a CBG.

FIG. 3 is a time channel diagram illustrating transmission on four channels towards three users/receivers during two time slots each corresponding to duration of a CBG. Consider that the transmitter tries to align allocations to different receivers with the bandwidths of the channels where LBT is done to reduce the risk that parts of the transport block aimed at a particular receiver cannot be transmitted.

Starting with the first slot, the transmitter, e.g. a network node, has prepared, i.e. as of Processing steps 1 and 2 elucidated above, a transmission for a first user with one CBG on channel 1 and one CBG on channel 2, and one CBG for each of a second and third user on channels 3 and 4, respectively. The outcome of LBT shows that channel 2 is busy, while channels 1, 3 and 4 are idle. The vertical lined marking of channel 2 is intended to illustrate that other transmissions occupy the channel. Thus, transmission is performed on channels 1, 3 and 4 according to plan, while the CBG intended for channel 2 cannot be transmitted. Without waiting for a NAK from the first user, the transmitter reallocates the CBG which transmission was omitted on channel 2 to be sent in next time slot on channel 1, as indicated by the arrow in FIG. 3. Continuing to observe the second slot, the pre-processing of CBGs for the second and third users managed to take advantage of the knowledge of the LBT outcome and adapted the CBGs to omit guard bands between channel 3 and channel 4 and transmits respective second CBGs for the second and third users accordingly.

If LBT failed on a channel, i.e. it was sensed as busy as indicated for channel 2 in FIG. 3, the transmitter already knows when starting the transmission that some (or all) code blocks will not be transmitted, it can thus retransmit them already in a subsequent transmission interval (e.g. slot or mini-slot) instead of waiting for feedback from the receiver. Due to processing delays in the transmitter, the retransmission for transmission interval n can only occur in interval n+k, where k≥$K_1$, where $K_1$ is a pre-processing time parameter. The value of $K_1$ depends on the transmitter implementation and can e.g. take the value 2. Cf. FIG. 1.

Once LBT has succeeded on a channel, i.e. the channel is sensed as free, the transmitter is allowed to transmit on that channel for a duration equal to the maximum transmission opportunity. The length depends among other things on which type of LBT the transmitter did and in which region it is operating. Typical lengths range from 1 ms to 10 ms. When scheduling subsequent transmission intervals, e.g. slots or mini-slots, the transmitter already knows which channels that were sensed as idle. Thus, the alignments of allocations are not required for subsequent scheduling intervals. Due to the processing delays in the transmitter, the transmitter typically prepares transport blocks in advance, Cf. FIG. 1. Hence, given that the transmitter has knowledge of channel availability in transmission interval n, it can use this information in transmission interval n+k, where k≥$K_2$, where $K_2$ is a pre-processing parameter. The value of $K_2$ depends on the transmitter implementation and can e.g. take the value 2. For some implementations, $K_1$=$K_2$.

For traditional retransmissions, a new redundancy version of the transmission is used. This may be applied for the retransmissions demonstrated above as well. However, since the transmitter knows the cause of the receiver not being able to properly receive the CBG in this case, the transmitter may use the same redundancy version for the retransmission as for the initial transmission, because the redundancy version intended for the initial transmission was not or only partly transmitted.

One option is that the transmitter and receiver rate matches the TB to match the channels that were sensed as free. In particular, this option can be used if only a small part of the total allocation for the receiver is mapped to a channel that was sensed as busy.

In case the allocation for a receiver crosses into an adjacent channel, the transmitter may try to align the CBs in each CBG within the TB to be as closely aligned with the channels as possible. That is, the transmitter tries to avoid that CBs within the same CBG are mapped to resource elements in different channels.

The transmitter then instructs, e.g. using dynamic signalling carried on a control channel or semi-statically using Radio Resource Control (RRC) signalling, the receiver to do CBG HARQ feedback, i.e. the receiver will, in addition to sending feedback per TB, send HARQ feedback per CBG. To maximize the possibility to align CBGs to channels, the receiver can be configured, using e.g. the RRC signalling, with multiple CBG sizes. The transmitter can then instruct the receiver, using e.g. dynamic signalling carried on a control channel, which code block group size to use.

The transmitter can then retransmit only CBs in the CBGs that were not received properly by the receiver.

In one embodiment, the CBs are mapped into CBGs in time before frequency. This has the benefit that fewer CBGs are needed when aligning to channels. The number of the CBGs which are impacted by LBT failures in certain channels may then become fewer. The transmitter can then signal to the UE if CBs should be mapped in time or frequency first. Note that even if CBs are mapped in frequency first, they can be mapped into groups in time first.

In another embodiment, the CBGs are prepared and mapped into channels in advance, i.e. before the LBT's outcome, by preserving guard bands between channels. The CBGs that were mapped to the free channels can then be quickly transmitted after LBT without the need of re-processing to make guard bands for the adjacent busy channels. The un-necessary guard bands between contiguous free channels are then filled up in subsequence intervals. Cf. FIG. 3. Given that the transmitter has the LBT outcome in transmission interval n, it can use this information for re-processing and filling up the un-necessary guard bands in interval n+k, where k≥$K_3$, where $K_3$ is a processing parameter. The value of $K_3$ depends on the transmitter implementation and can e.g. take the value 2.

Figure 4:
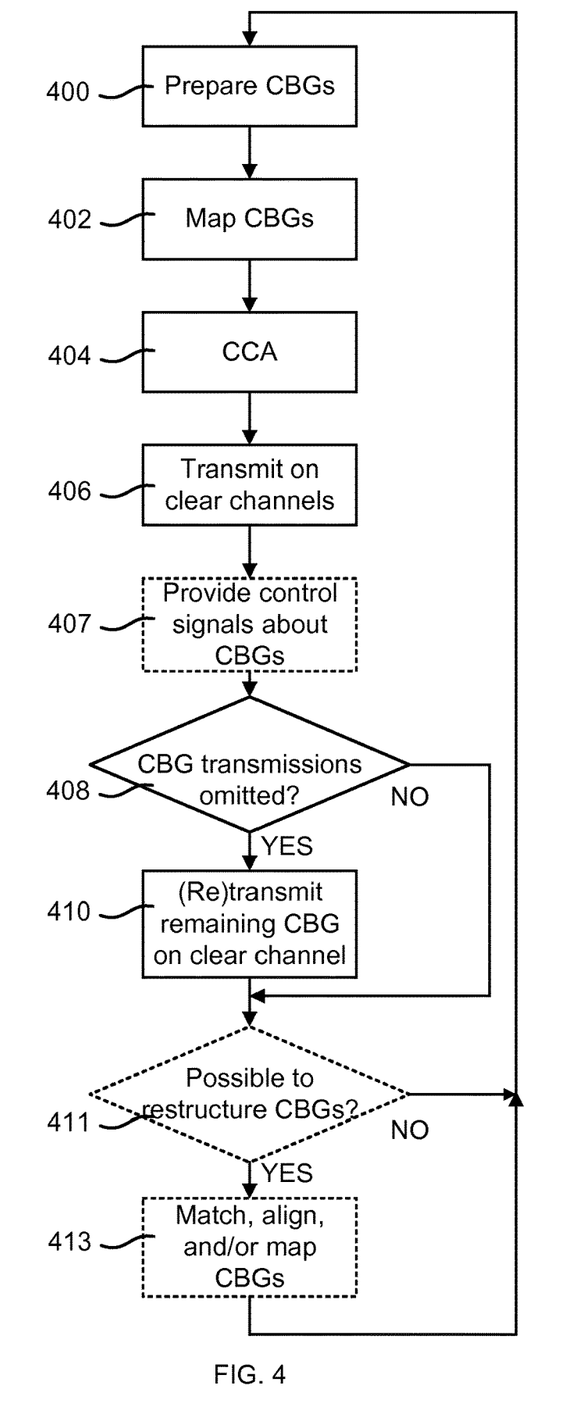
FIG. 4 is a flow chart illustrating a method according to an embodiment.

FIG. 4 is a flow chart schematically illustrating a method for a network node, which for example may be an access point, a base station, or other central radio access node, or a dedicated gNB. The method comprises actions for performing any of the approaches demonstrated above, which approaches are applicable separately, but also in any combination.

CBGs are prepared 400 similar to what was referred to as Processing step 1 with reference to FIG. 1. That is, CBs of a TB is grouped into CBGs which CBs are each provided with a checksum to enable a per CBG HARQ process, i.e. ACK is provided for the CBG if all CBs thereof provide a correct checksum, otherwise a NAK is provided for the CBG. The CBGs are mapped on channels to the best of the knowledge of the network node. That is, if no assessment whether channels are clear has been made for the time period in being, the network node maps the CBGs on the channels on which clear channel assessment, CCA, is going to be performed 404, or is ongoing by no result yet achieved. If an assessment has been made for the channels, the network node is able to map the CBGs in light of that. For example, an assessment has been made for a previous transport block and a further transport block or a part thereof is to be transmitted within a time period for which the CCA is valid. From this, we can see that the initial steps 400, 402 and 404 are readily to be considered performed on a real-time basis, and their performing are slightly depending on what input values that are available.

When result of the CCA 404 is available, the network node transmits 406 on channels assessed as clear. Depending on setup, the network node may also transmit 407 control signals about transmitted CBGs.

That is, CBGs mapped on channels that are not clear cannot be transmitted. The network node knows about this, and checks 408 for CBGs omitted from transmission. If no CBGs have been omitted to be transmitted, the procedure continues, but if any CBG is omitted from transmission, that CBG is retransmitted on a clear channel. Here, "retransmitted" should be interpreted in the light of the mechanism used, e.g. HARQ, and not in its absolute meaning since the CBG was never transmitted. The "retransmission" may use a new redundancy version, as commonly applied in retransmissions, but since there never was any transmission, the retransmission may use the same redundancy version as for the original transmission which never took place.

Optionally, if new knowledge is gained since mapping of the CBGs, e.g. achieved result from CCA, queue of needed retransmissions, etc., the network node may check 411 possibilities for restructuring mapping of CBGs. If no such possibilities, or needs, exist, the procedure continues and further transmissions are prepared and performed, but if there is possibility and need for restructuring of CBGs, the network node provides an additional matching, mapping and/or alignment of CBGs before continuing with transmissions.

Above, it was elucidated that the initial steps could be seen to operate on a real-time basis, which should be readily understandable. With the whole process now in mind, it is also understandable that all actions are operable on a real-time basis to get the transmissions flowing efficiently. The boxes and arrows of the flow chart of FIG. 4 is therefore mainly for the understanding of the principle, and is not to be considered as a direct explanation of the process.

It is further to be understood that the features demonstrated with reference to FIGS. 1 to 3 are applicable, in any combination, with the above given description of the process, and for the sake of brevity, clarity, and ease of understanding not given again with applicable step or steps since such a description would rather obscure the teachings than to enlighten the skilled reader.

Figure 5:
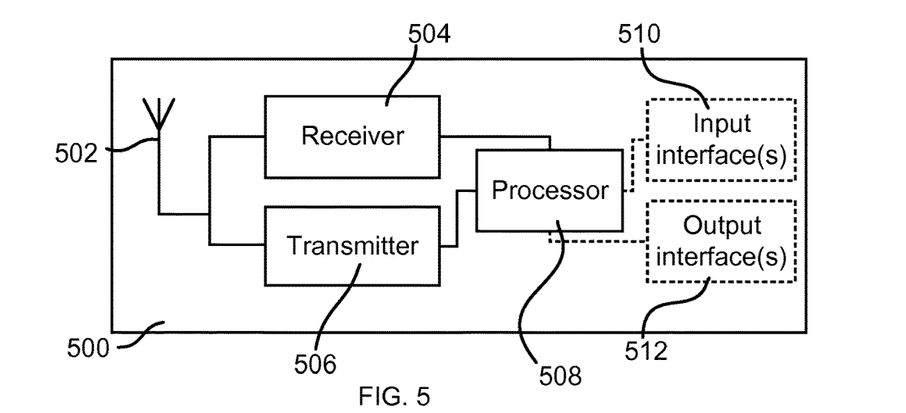
FIG. 5 is a block diagram schematically illustrating a network node according to an embodiment.

FIG. 5 is a block diagram schematically illustrating a network node 500 according to an embodiment. The network node 500, which for example may be an access point, a base station, or other central radio access node, or a dedicated gNB, comprises an antenna arrangement 502, a receiver 504 connected to the antenna arrangement 502, a transmitter 506 connected to the antenna arrangement 502, a processing element 508 which may comprise one or more circuits, one or more input interfaces 510 and one or more output interfaces 512. The interfaces 510, 512 can be operator interfaces and/or signal interfaces, e.g. electrical or optical. The network node 500 is arranged to operate in an unlicensed spectrum where LBT is applied, and is arranged handle CBGs as demonstrated above. In particular, by the processing element 508 being arranged to perform the embodiments demonstrated with reference to FIGS. 1 to 4, the network node 500 is capable of handling CBGs to reduce delays in retransmissions and/or to improve radio resource handling as demonstrated above. The processing element 508 can also fulfill a multitude of tasks, ranging from signal processing to enable reception and transmission since it is connected to the receiver 504 and transmitter 506, executing applications, controlling the interfaces 510, 512, etc.

Figure 6:
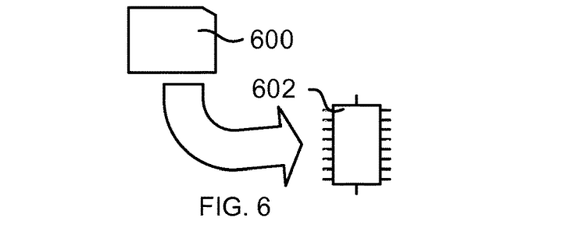
FIG. 6 schematically illustrates a computer-readable medium and a processing device.

The methods according to the present disclosure are suitable for implementation with aid of processing means, such as computers and/or processors, especially for the case where the processing element 508 demonstrated above comprises a processor handling the preparation/re-preparation, transmissions/retransmissions, aligning and allocations as demonstrated above. Therefore, there is provided computer programs, comprising instructions arranged to cause the processing means, processor, or computer to perform the steps of any of the methods according to any of the embodiments described with reference to FIGS. 1 to 4. The computer programs preferably comprise program code which is stored on a computer readable medium 600, as illustrated in FIG. 6, which can be loaded and executed by a processing means, processor, or computer 602 to cause it to perform the methods, respectively, according to embodiments of the present disclosure, preferably as any of the embodiments described with reference to FIGS. 1 to 4. The computer 602 and computer program product 600 can be arranged to execute the program code sequentially where actions of the any of the methods are performed stepwise, or be arranged to perform actions on a real-time basis. The processing means, processor, or computer 602 is preferably what normally is referred to as an embedded system. Thus, the depicted computer readable medium 600 and computer 602 in FIG. 6 should be construed to be for illustrative purposes only to provide understanding of the principle, and not to be construed as any direct illustration of the elements.

Figure 7:
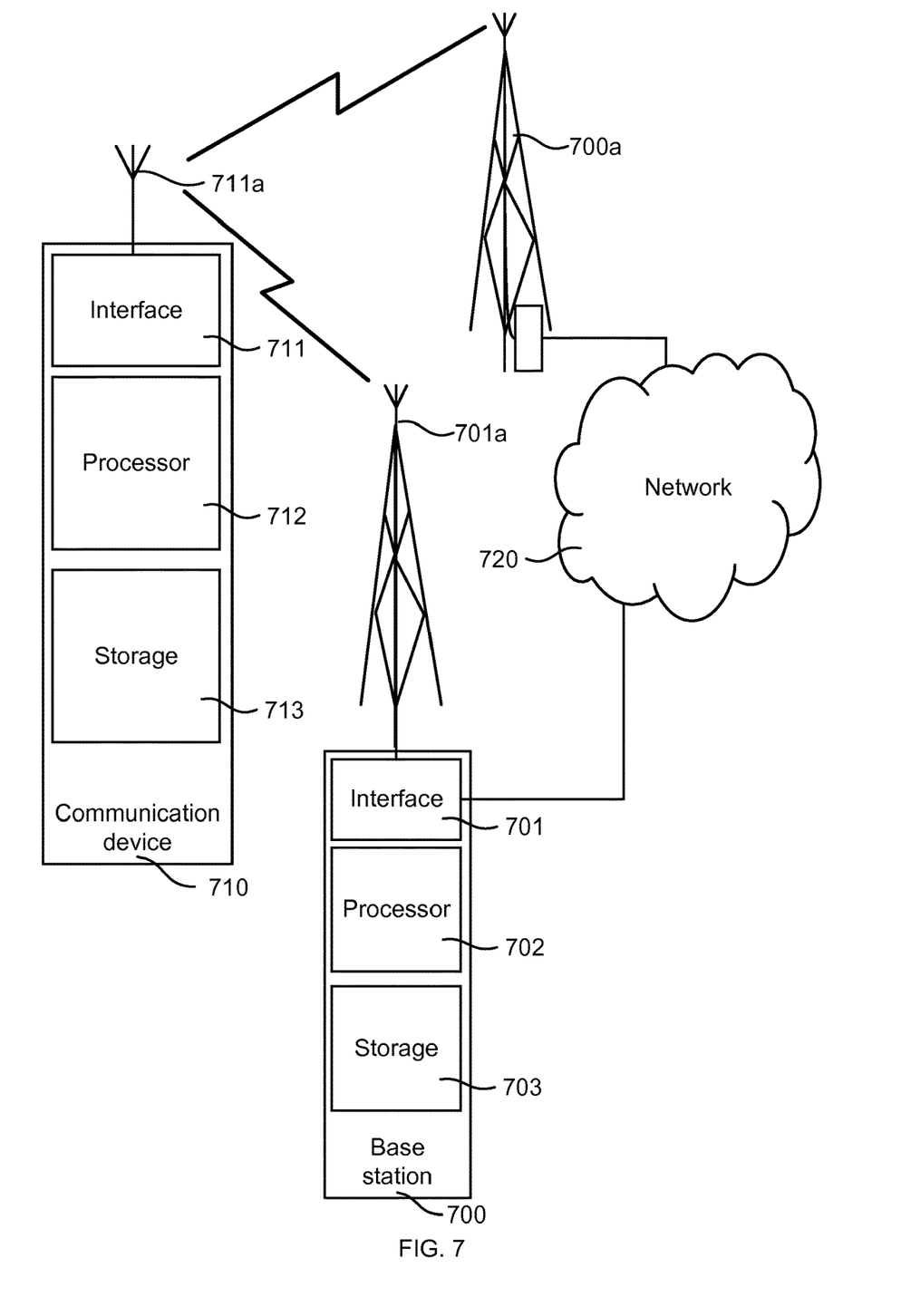
FIG. 7 illustrates a wireless network comprising network nodes and a wireless device.

FIG. 7 illustrates a wireless network comprising NW nodes 700 and 700a and a wireless device 710 with a more detailed view of the network node 700 and the communication device 710 in accordance with an embodiment. For simplicity, FIG. 7 only depicts core network 720, network nodes 700 and 700a, and communication device 710. Network node 700 comprises a processor 702, storage 703, interface 701, and antenna 701a. Similarly, the communication device 710 comprises a processor 712, storage 713, interface 711 and antenna 711a. These components may work together in order to provide network node and/or wireless device functionality as demonstrated above. In different embodiments, the wireless network may comprise any number of wired or wireless networks, network nodes, base stations, controllers, wireless devices, relay stations, and/or any other components that may facilitate or participate in the communication of data and/or signals whether via wired or wireless connections.

The network 720 may comprise one or more IP networks, public switched telephone networks (PSTNs), packet data networks, optical networks, wide area networks (WANs), local area networks (LANs), wireless local area networks (WLANs), public land mobile networks (PLMNs), wired networks, wireless networks, metropolitan area networks, and other networks to enable communication between devices. The network 720 may comprise a network node for performing the method demonstrated with reference to FIGS. 1 to 4, and/or an interface for signalling between network nodes 700, 700a.

The network node 700 comprises a processor 702, storage 703, interface 701, and antenna 701a. These components are depicted as single boxes located within a single larger box. In practice however, a network node may comprise multiple different physical components that make up a single illustrated component (e.g., interface 701 may comprise terminals for coupling wires for a wired connection and a radio transceiver for a wireless connection). Similarly, network node 700 may be composed of multiple physically separate components (e.g., a NodeB component and a radio network controller (RNC) component, a base transceiver station (BTS) component and a base station controller (BSC) component, etc.), which may each have their own respective processor, storage, and interface components. In certain scenarios in which network node 700 comprises multiple separate components (e.g., BTS and BSC components), one or more of the separate components may be shared among several network nodes. For example, a single RNC may control multiple NodeBs. In such a scenario, each unique NodeB and BSC pair, may be a separate network node. In some embodiments, network node 700 may be configured to support multiple radio access technologies (RATs), and among them such RATs applicable in unlicensed spectrum. In particular, the operation in unlicensed spectrum may be applied as demonstrated above. In such embodiments, some components may be duplicated (e.g., separate storage 703 for the different RATs) and some components may be reused (e.g., the same antenna 701a may be shared by the RATs).

The processor 702 may be a combination of one or more of a microprocessor, controller, microcontroller, central processing unit, digital signal processor, application specific integrated circuit, field programmable gate array, or any other suitable computing device, resource, or combination of hardware, software and/or encoded logic operable to provide, either alone or in conjunction with other network node 700 components, such as storage 703, network node 700 functionality. For example, processor 702 may execute instructions stored in storage 703. Such functionality may include providing various wireless features discussed herein to a wireless communication device, such as the wireless device 710, including any of the features or benefits disclosed herein.

Storage 703 may comprise any form of volatile or non-volatile computer readable memory including, without limitation, persistent storage, solid state memory, remotely mounted memory, magnetic media, optical media, random access memory (RAM), read-only memory (ROM), removable media, or any other suitable local or remote memory component. Storage 703 may store any suitable instructions, data or information, including software and encoded logic, utilized by the network node 700. the storage 703 may be used to store any calculations made by the processor 702 and/or any data received via the interface 701.

The network node 700 also comprises the interface 701 which may be used in the wired or wireless communication of signalling and/or data between network node 700, network 720, and/or wireless device 710. For example, the interface 701 may perform any formatting, coding, or translating that may be needed to allow network node 700 to send and receive data from the network 720 over a wired connection. The interface 701 may also include a radio transmitter and/or receiver that may be coupled to or a part of the antenna 701a. The radio may receive digital data that is to be sent out to other network nodes or wireless devices via a wireless connection. The radio may convert the digital data into a radio signal having the appropriate channel and bandwidth parameters. The radio signal may then be transmitted via antenna 701a to the appropriate recipient (e.g., the wireless device 710).

The antenna 701a may be any type of antenna capable of transmitting and receiving data and/or signals wirelessly. In some embodiments, antenna 701a may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. The antenna 701a may comprise one or more elements for enabling different ranks of SIMO, MISO or MIMO operation, or beamforming operations.

The wireless device 710 may be any type of communication device, wireless device, UE, D2D device or ProSe UE suitable for operation in unlicensed spectrum, i.e. with LBT capabilities, but may in general be any device, sensor, smart phone, modem, laptop, Personal Digital Assistant (PDA), tablet, mobile terminal, smart phone, laptop embedded equipped (LEE), laptop mounted equipment (LME), Universal Serial Bus (USB) dongles, machine type UE, UE capable of machine to machine (M2M) communication, etc., which is able to wirelessly send and receive data and/or signals to and from a network node, such as network node 700 and/or other wireless devices. The wireless device 710 comprises a processor 712, storage 713, interface 711, and antenna 711a. Like the network node 700, the components of the wireless device 710 are depicted as single boxes located within a single larger box, however in practice a wireless device may comprises multiple different physical components that make up a single illustrated component (e.g., storage 713 may comprise multiple discrete microchips, each microchip representing a portion of the total storage capacity).

The processor 712 may be a combination of one or more of a microprocessor, controller, microcontroller, central processing unit, digital signal processor, application specific integrated circuit, field programmable gate array, or any other suitable computing device, resource, or combination of hardware, software and/or encoded logic operable to provide, either alone or in combination with other wireless device 710 components, such as storage 713, wireless device 710 functionality. Such functionality may include providing various wireless features discussed herein, including any of the features or benefits disclosed herein.

The storage 713 may be any form of volatile or non-volatile memory including, without limitation, persistent storage, solid state memory, remotely mounted memory, magnetic media, optical media, random access memory (RAM), read-only memory (ROM), removable media, or any other suitable local or remote memory component. The storage 713 may store any suitable data, instructions, or information, including software and encoded logic, utilized by the wireless device 710. The storage 713 may be used to store any calculations made by the processor 712 and/or any data received via the interface 711.

The interface 711 may be used in the wireless communication of signalling and/or data between the wireless device 710 and the network nodes 700, 700a. For example, the interface 711 may perform any formatting, coding, or translating that may be needed to allow the wireless device 710 to send and receive data to/from the network nodes 700, 700a over a wireless connection. The interface 711 may also include a radio transmitter and/or receiver that may be coupled to or a part of the antenna 711a. The radio may receive digital data that is to be sent out to e.g. the network node 701 via a wireless connection. The radio may convert the digital data into a radio signal having the appropriate channel and bandwidth parameters. The radio signal may then be transmitted via the antenna 711a to e.g. the network node 700.

The antenna 711a may be any type of antenna capable of transmitting and receiving data and/or signals wirelessly. In some embodiments, antenna 711a may comprise one or more omni-directional, sector or panel antennas operable to transmit/receive radio signals between 2 GHz and 66 GHz. For simplicity, antenna 711a may be considered a part of interface 711 to the extent that a wireless signal is being used. The antenna 711a may comprise one or more elements for enabling different ranks of SIMO, MISO or MIMO operation, or beamforming operations.

In some embodiments, the components described above may be used to implement one or more functional modules used for enabling measurements as demonstrated above. The functional modules may comprise software, computer programs, sub-routines, libraries, source code, or any other form of executable instructions that are run by, for example, a processor. In general terms, each functional module may be implemented in hardware and/or in software. Preferably, one or more or all functional modules may be implemented by the processors 712 and/or 702, possibly in cooperation with the storage 713 and/or 703. The processors 712 and/or 702 and the storage 713 and/or 703 may thus be arranged to allow the processors 712 and/or 702 to fetch instructions from the storage 713 and/or 703 and execute the fetched instructions to allow the respective functional module to perform any features or functions disclosed herein. The modules may further be configured to perform other functions or steps not explicitly described herein but which would be within the knowledge of a person skilled in the art.

Certain aspects of the proposed concepts have mainly been described above with reference to a few embodiments. However, as is readily appreciated by a person skilled in the art, embodiments other than the ones disclosed above are equally possible and within the scope of the proposed concepts. Similarly, while a number of different combinations have been discussed, all possible combinations have not been disclosed. One skilled in the art would appreciate that other combinations exist and are within the scope of the proposed concepts. Moreover, as is understood by the skilled person, the herein disclosed embodiments are as such applicable also to other standards and communication systems and any feature from a particular figure disclosed in connection with other features may be applicable to any other figure and or combined with different features.

The invention claimed is:

1. A network node arranged to provide communication at least in an unlicensed band where clear channel assessment (CCA) is required before transmissions, wherein the unlicensed band comprises a plurality of carriers, or sets of carriers, defining channels, and the network node is arranged to:
   operate in the unlicensed band by:
      preparing code block groups comprising code blocks from transport blocks, which transport blocks each comprises a payload intended for a respective receiver, wherein each code block comprises a checksum enabling a hybrid automatic repeat request (HARQ) procedure on a per code block group basis;
      mapping the code block groups to a wideband signal comprising a consecutive set of channels on the carriers of the unlicensed band;
      sensing the respective channels to assess whether the channels, respectively, are clear, and transmitting the code block groups mapped on the channels which are clear and omitting transmissions of code block groups mapped on channels that are not clear, wherein the assessment and the transmissions are performed within a first time interval; and
      transmitting code blocks groups omitted to be transmitted using the HARQ procedure for retransmission prior to receiving a non-acknowledgement (NAK) from a respective receiver of the code block group.

2. The network node of claim 1, arranged to retransmit the code block groups omitted from being transmitted due to the channel not being clear, wherein the retransmission uses a same redundancy version as the omitted transmission would have used.

3. The network node of claim 1, wherein a transport block comprising code block groups for transmissions within the first time interval is matched to channels which are determined by the CCA.

4. The network node of claim 1, wherein the mapping of code block groups for a receiver comprises alignment of the code block groups to adjacent channels.

5. The network node of claim 4, arranged to apply multiple-input-multiple-output (MIMO) wherein the alignment of the code block groups is further based on used MIMO layers.

6. The network node of claim 4, arranged to provide control signals to receivers about code block group alignment.

7. The network node of claim 1, arranged to apply guard bands between the channels at initial mapping of the code block groups to the channels.

8. The network node of claim 7, further arranged to omit guard bands between adjacent clear channels at further transmissions when mapping of the code block groups to the channels when result of CCA is known for the first time interval.

9. The network node of claim 1, wherein the mapping of the code block groups to a wideband signal comprises mapping in time and channel, and the network node is arranged to initially group code blocks into the code block groups time-wise for forming the code block groups, and then to map the code block groups on the channels.

10. A method performed by a network node which is arranged to provide communication at least in an unlicensed band where clear channel assessment (CCA) is required before transmissions, wherein the unlicensed band comprises a plurality of carriers, or sets of carriers, defining channels, the method comprising:
    operating in the unlicensed band by:
       preparing code block groups comprising code blocks from transport blocks, which transport blocks each comprises a payload intended for a respective receiver, wherein each code block comprises a checksum enabling a hybrid automatic repeat request (HARQ) procedure on a per code block group basis;
       mapping the code block groups to a wideband signal comprising a consecutive set of channels on the carriers of the unlicensed band;
       sensing the respective channels to assess whether the channels, respectively, are clear, and transmitting the code block groups mapped on the channels which are clear and omitting transmissions of code block groups mapped on channels that are not clear, wherein the assessment and the transmissions are performed within a first time interval; and
       transmitting code blocks groups omitted to be transmitted using the HARQ procedure for retransmission prior to receiving a non-acknowledgement (NAK) from a respective receiver of the code block group.

11. The method of claim 10, comprising retransmitting the code block groups omitted from being transmitted due to the channel not being clear, wherein the retransmission uses a same redundancy version as the omitted transmission would have used.

12. The method of claim 10, comprising matching a transport block comprising code block groups for transmission within the first time interval to channels which are determined by the CCA.

13. The method of claim 10, wherein the mapping of code block groups for a receiver comprises aligning the code block groups to adjacent channels.

14. The method of claim 13, comprising applying multiple-input-multiple-output (MIMO) wherein the aligning of the code block groups is further based on used MIMO layers.

15. The method of claim 13, comprising providing control signals to receivers about code block group alignment.

16. The method of claim 10, comprising applying guard bands between the channels at initial mapping of the code block groups to the channels.

17. The method of claim 16, further arranged to omit guard bands between adjacent clear channels at further transmissions when mapping of the code block groups to the channels when result of CCA is known for the first time interval.

18. The method of claim 10, wherein the mapping of the code block groups to a wideband signal comprises mapping in time and channel, and the method comprises initially grouping code blocks into the code block groups time-wise for forming the code block groups, and then mapping the code block groups on the channels.

19. A non-transitory computer readable storage medium comprising instructions which, when executed on a processor of a network node, causes the network node to perform a method, wherein the network node is arranged to provide communication at least in an unlicensed band where clear channel assessment (CCA) is required before transmissions, wherein the unlicensed band comprises a plurality of carriers, or sets of carriers, defining channels, and wherein the method comprises:

operating in the unlicensed band by:

preparing code block groups comprising code blocks from transport blocks, which transport blocks each comprises a payload intended for a respective receiver, wherein each code block comprises a checksum enabling a hybrid automatic repeat request (HARQ) procedure on a per code block group basis;

mapping the code block groups to a wideband signal comprising a consecutive set of channels on the carriers of the unlicensed band;

sensing the respective channels to assess whether the channels, respectively, are clear, and transmitting the code block groups mapped on the channels which are clear and omitting transmissions of code block groups mapped on channels that are not clear, wherein the assessment and the transmissions are performed within a first time interval; and transmitting code blocks groups omitted to be transmitted using the HARQ procedure for retransmission prior to receiving a non-acknowledgement (NAK) from a respective receiver of the code block group.

* * * * *